UNITED STATES PATENT OFFICE.

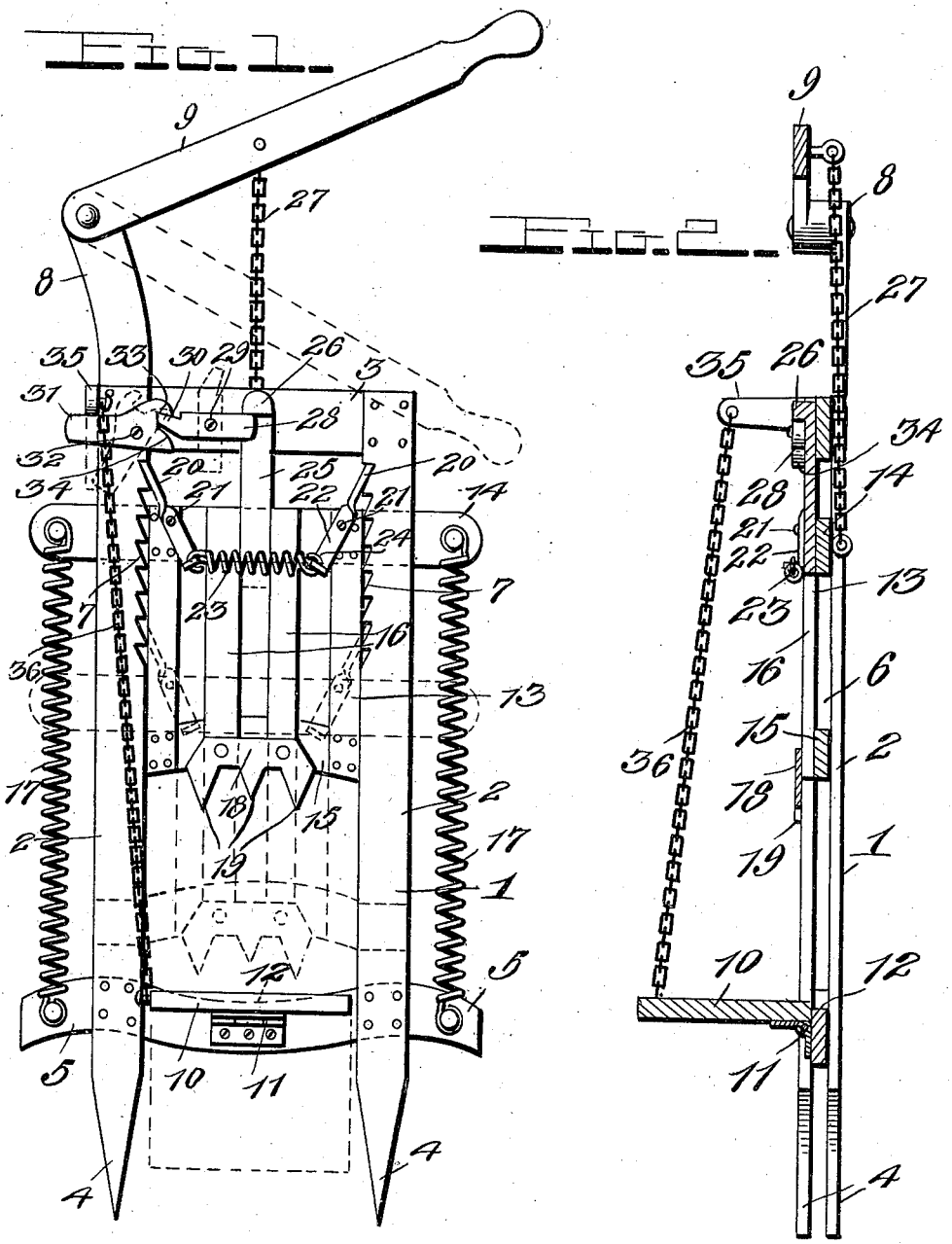

EMIL H. DIERKS, OF BRYANT, IOWA.

TRAP.

996,067.

Specification of Letters Patent. Patented June 27, 1911.

Application filed September 6, 1910. Serial No. 580,475.

*To all whom it may concern:*

Be it known that I, EMIL H. DIERKS, a citizen of the United States, residing at Bryant, in the county of Clinton and State of Iowa, have invented certain new and useful Improvements in Traps, of which the following is a specification, reference being had to the accompanying drawings.

This invention is an improved animal trap for catching ground hogs, badgers, skunks, wolves and other animals, the object of the invention being to provide an improved trap which may be readily set near the den of the animal, and which will catch and securely hold the animal, the invention consisting in the construction, combination and arrangement of devices hereinafter described and claimed.

In the accompanying drawings—Figure 1 is a front elevation of my improved trap showing the same set in full lines and sprung in dotted lines. Fig. 2 is a longitudinal central sectional view of the same.

In the construction of my improved trap, I provide an upright frame 1, which comprises a pair of side posts 2, and a cross bar 3, the ends of which are attached to the upper ends of said posts. Each of the posts is sharpened at its lower end as at 4 so that the lower ends of the posts may be readily set in the ground to secure the frame in an upright position near the den of an animal. A cross bar 5 connects the posts together at a suitable distance from their lower ends, the ends of the said cross bar projecting beyond the sides of the frame as shown. Each of the said posts is provided with a vertical slot 6 which extends from near its lower end to a point near its upper end. The cross bar 5 is at the lower ends of the said slots. Each post is also provided on its inner side at one side of the slot therein with a series of ratchet teeth 7. One of the posts has at its upper end an upwardly curved arm 8 to which is pivoted one end of a setting lever 9. A tripping board 10 extends forwardly from the cross bar 5, and is connected thereto by a hinge 11, so that the said tripping board is adapted for vertical angular movement. The upper side of the cross bar 5 is concave as at 12, at a point between the posts 2.

A deadfall or gate 13, is movable vertically in the frame, and is here shown as comprising an upper bar 14, a lower bar 15, and vertical bars 16, which connect the upper and lower bars.

The upper and lower bars operate in the slots 6, and the outer vertical bars bear against the opposing sides of the posts 2 and serve to guide the deadfall or gate. The ends of the upper bar 14 project beyond the outer sides of the frame and the said projecting ends of the said bar 14 are connected to the projecting ends of the fixed cross bar 5, by means of springs 17 which are here shown as coiled retractile springs. A plate 18 is secured to the lower side of the gate and is provided with downwardly extending spurs 19. Detent pawls 20 are pivotally mounted at the upper end of the deadfall or gate as at 21, and are adapted to engage the ratchet teeth 7. The said detent pawls are provided with downwardly extending arms 22, which are connected together by a spring 23 which has a hook 24 at one end whereby it may be engaged with or disengaged from one of the said arms. When the spring is thus hooked to the said arm, of said detent pawl, the spring serves to connect the pawls, and to actuate them so that they will engage the ratchet teeth and prevent the raising of the deadfall or gate, as will be understood. At the upper side of the gate is an upwardly extending arm 25 provided at its upper end with a forwardly extending detent shoulder 26. A chain 27 connects the lever 9 to the gate and enables the latter to be raised, against the tension of the springs 17, when the detent pawls are disengaged from the ratchet teeth 7.

On the front side of the cross bar 3, at a suitable point is a pivotally mounted catch 28, the pivot of which is indicated at 29. The said catch may be turned so as to dispose one end thereof under the detent shoulder 26 of the gate, when the latter has been raised, and the said catch is provided at the opposite end with a finger 30. A trigger 31 is pivotally mounted on the front side of the frame 1 near one upper corner thereof, its pivot being connected at 32. The said trigger has at its inner end a notch 33 for engagement by the finger 30 of the catch 28, the lower side of the said notch being formed by an arm 34 which extends below the finger 30, when the catch is in engaged position with reference to the shoulder 26 of the deadfall or gate.

A trip arm 35 is pivotally mounted at the upper end of the frame and extends forwardly across and above the trigger, the front end of the said trip arm being connected to the free front end of the trip board 10 by means of a chain 36 or other suitable connecting device.

When the gate or deadfall has been raised as hereinbefore indicated, and its detent shoulder engaged by the catch, and the trigger set in engaged position with the catch, the outer end of the trigger raises the trip arm 35 and hence causes the chain 36 to raise the front end of the trip board 10. When the animal in attempting to pass through the frame on leaving or entering the den steps upon the trip board, the latter is depressed, thereby causing the trip arm to draw downwardly on the outer end of the trigger and hence causing the arm 34 of the trigger to move upwardly and force the catch out of engagement with the notch 33 in the inner end of the trigger and thereupon, the springs drive the gate or deadfall downwardly and impale the animal on the spurs 19. The detent pawls by engagement with the ratchet teeth 7 effectually prevent the animal from raising the gate or deadfall and releasing itself and hence the animal is securely held by the trap. Before raising the gate to set the trap, the spring 23 must be disconnected from one of the detent pawls. When thus disconnected, the detent pawls, owing to the weight of their downwardly extending arms 22 will be moved and kept out of engagement with the ratchet teeth 7.

My improved trap is cheap and simple, is very strong, and durable, may be easily set and serves to effectually catch an animal so that it cannot get away.

I claim:—

A trap of the class described comprising a frame, a trip board connected thereto for vertical angular movement and extending from one side thereof, a dead fall movable in and guided by the frame, and provided at its lower end with impaling spurs, and at its upper end with a detent shoulder, a catch on the same side of the frame with the trip board, pivotally connected to the frame, and having an end to engage said detent shoulder of the dead fall, and provided at the opposite end with a finger, a trigger pivotally mounted on the same side of the frame with the catch, said trigger having a notch in its inner end to receive the finger of the catch, and providing an arm to extend under the finger of the catch and move the same out of engagement with the detent, the opposite end of said trigger projecting beyond one side of said frame, a trip arm pivoted to the side of the frame beyond which the trigger extends, and adapted to bear on said trigger arm, and a connection between the said trip arm and the said trip board.

In testimony whereof I hereunto affix my signature in the presence of two witnesses.

EMIL H. DIERKS.

Witnesses:
HANS SCHROEDER,
L. J. HANSJEN.

---

Copies of this patent may be obtained for five cents each, by addressing the "Commissioner of Patents, Washington, D. C."